Dec. 29, 1970   A. FRÖHLICH   3,550,194
APPARATUS FOR MAKING SLIDE-FASTENER COUPLING ELEMENTS
Filed Nov. 8, 1968   4 Sheets-Sheet 1

INVENTOR.
ALFONS FRÖHLICH
BY
Karl F. Ross
ATTORNEY

INVENTOR,
ALFONS FRÖHLICH
BY
Karl F Ross
ATTORNEY

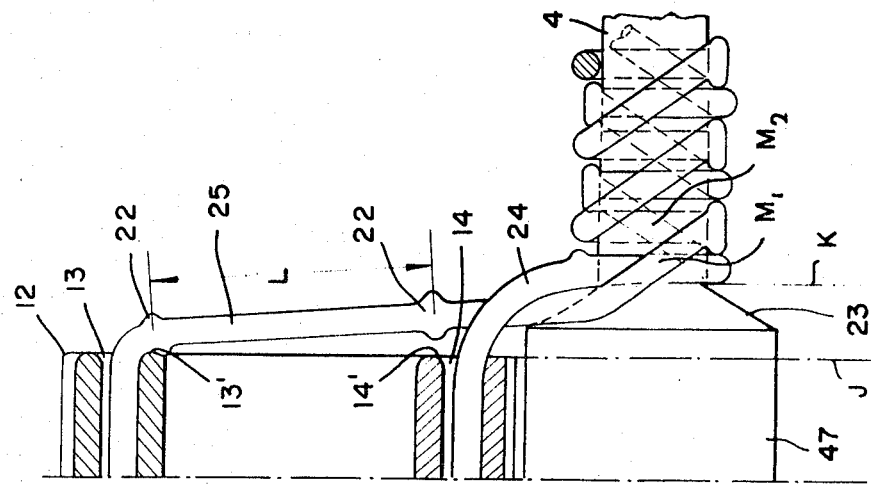
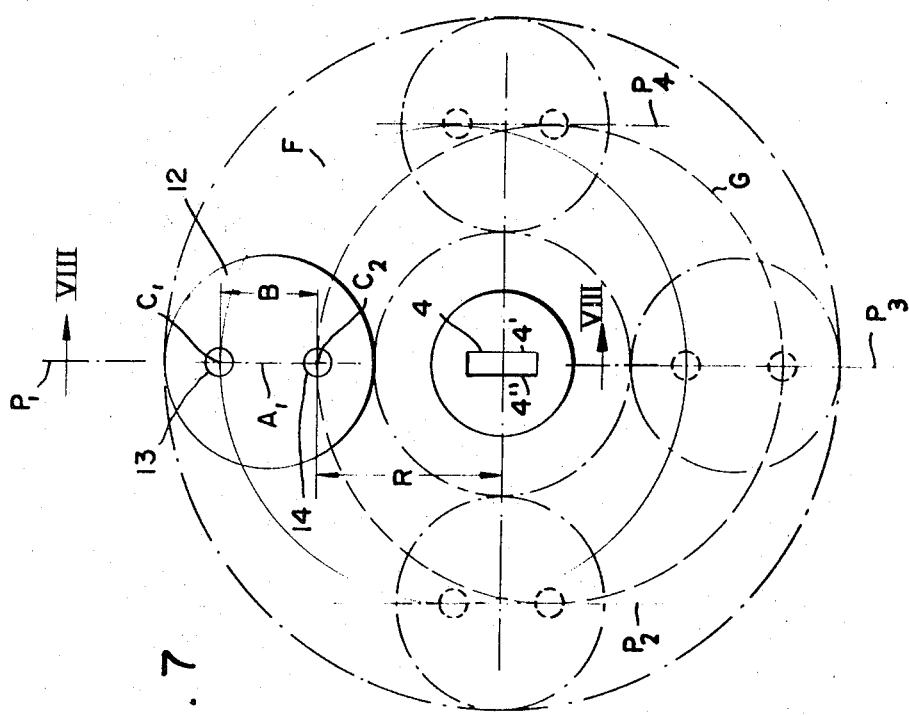

United States Patent Office 3,550,194
Patented Dec. 29, 1970

3,550,194
APPARATUS FOR MAKING SLIDE-FASTENER COUPLING ELEMENTS
Alfons Frohlich, Essen, Germany, assignor to Opti-Holding AG., Glarus, Switzerland, a corporation of Switzerland
Continuation-in-part of application Ser. No. 653,421, July 14, 1967. This application Nov. 8, 1968, Ser. No. 783,447
Claims priority, application Germany, Nov. 8, 1967, 1,610,385
Int. Cl. B29c 23/00
U.S. Cl. 18—1                                             7 Claims

ABSTRACT OF THE DISCLOSURE

Apparatus for making slide-fastener coupling elements in which a thread-guide bushing is rotated in an orbital movement about a mandrel which is held stationary. The thread-guide bushing has a pair of bores accommodating respective thermoplastic monofilament threads and is retained in predetermined orientation with respect to the mandrel so that each turn of the coil crosses over and under the other thread at least once.

---

This application is a continuation-in-part of my application Ser. No. 653,421 filed July 14, 1967 (now U.S. Pat. No. 3,423,803).

The present invention relates to a device for making coupling elements for slide-fastener stringers; more particularly, this invention relates to an apparatus for the manufacture of coiled continuous thermoplastic-filament coupling elements adapted to be affixed to respective stringer tapes and formed with coupling heads at each turn for mating engagement when a slider is drawn along the coupling elements in a closure assembly or stringer.

In my above-identified copending and commonly assigned application Ser. No. 653,421, I have described a method of making coupling elements and an improved coupling element structure. According to that application, the coupling elements for slide fasteners are produced with relatively fine gauge and close, fixed interhead spacing, by helicoidally winding a plurality (e.g. two or three) of synthetic-resin monofilamentary thermoplastic strands or threads about a mandrel or other support in close-contacting relationship. Thus, at least along one longitudinal side of the resulting coil, the adjacent turns of the several strands or threads are in contacting relationship. Thereafter or concurrently, the coil may be deformed along its opposite longitudinal sides so as to impart the desired head configuration and separation to the adjacent turns while the bight portions between these turns remain in contacting relationship along their flanks and have a scale-like overlapping appearance. The mutually contacting bight portions of the plurality strand maintain the spacing of the respective heads while the pitch of each of the strands may be two or more times the pitch of earlier helicoidal coupling elements with corresponding head spacing.

The contacting bight portions are deformed so as to be interfitting, thereby providing relative shifting of the strands making up the coil. It has been found, moreover, that the formation of the head can be improved by shaping each turn so that each head is coplanar with a pair of mutually parallel shanks joining the head with the bight portions of the adjacent turns of the same strand. The mutual and direct contact of the bight portions rigidly maintains the shanks and the head in the desired spaced relationship and a relatively rigid coupling element is constituted without danger of distortion and dislocation with these bight portions having a scale-like and overlapping configuration.

The planes of the shanks and the respective heads are perpendicular to the plane of the support tape and to the direction of movement of the slider while the bight portions are oblique to these planes. The separation between the heads is thus readily maintainable at its original tolerance. Attachment of the coupling elements to the respective support tape can be accomplished without difficulty by thermal bonding, adhesives, chain stitching or the like to a foil or fabric band. The coupling elements may be mounted in a fabric band by insertion of the heads through spaced-apart openings in a sleeve-like formation of the fabric band. Relatively fine strands may be wound at high rate to produce the coupling elements.

The method of making a coupling element, for attachment to a support band or tape to form a slide fastener half or stringer, thus comprises the steps of coiling a plurality of monofilamentary thermoplastic strands generally helicoidally and in intertwined relationship with the turns thereof in mutually contacting relationship; and deforming the multistrand coil thus produced along one longitudinal side to provide spaced-apart coupling heads at each turn matingly interengageable with corresponding heads of a similar coupling element while maintaining bight portions of the turns in close contact with one another along the opposite longitudinal side of the coil. The method may also include the step of deforming the bight portions of the turns into interfitting relationship between the adjacent turns of the different strands, thereby preventing relative shifting of the strands, the bight portions being oriented in scale-like overlapping relationship. The strands are spun into the coil about a mandrel extending along a fixed axis of the coil from a plurality of bobbins which are rotated about this axis while paying off the strands.

In addition to this system, one may note that the use of stationary mandrels for the coiling of a thermoplastic filament into a continuous coupling element of the general character described has been proposed heretofore, the bobbin being spun generally about the axis of the mandrel. The coupling element is deformed on the mandrel and led from the latter for attachment to the stringer tape. In some prior-art arrangements, two such coiled coupling elements are brought together and interfitted for joint attachment to the respective tapes, thereby forming the complete stringer which is separable by a slider which can be mounted thereon. The means for deforming the turns of the coupling element can be toothed wheels or the like and frequently additional means must be provided for advancing the coils along the mandrel. In general, the prior-art techniques along these lines have been expensive and difficult to carry out efficiently without interruption. Moreover, they have involved costly machinery, have been of limited speed and have been characterized by the need to use relatively small bobbins and thus have required frequent replacement of the empty bobbin by fresh bobbins.

It is, therefore, the principal object of the present invention to provide an improved apparatus for the coiling of coupling elements from synthetic resin filaments whereby some of all of the aforementioned disadvantages are eliminated, the apparatus costs can be reduced and the labor involved in the formation of the coupling elements can be less skilled.

Another object of this invention is the provision of a system of making coupling elements for slide-fastener stringers of lower cost and at higher rates than has been possible heretofore.

I have found, surprisingly, that these objects (and others which will be apparent hereinafter) are attainable by coiling two or more thermoplastic filaments upon a mandrel into continuous coupling-element coils by maintaining the bobbins or spools from which the individual strands or filaments are drawn stationary with respect to the axis of the mandrel, the coils being interleaved such that the turns of one coil cross each other twice per turn (i.e. each filament crosses the other once above and once below) to form interleaved turns wound in the same sense.

According to a more specific feature of this invention, the coupling elements are wound with identical cross-section and profile so that they are oriented substantially symmetrically with respect to the axis of the mandrel on which they are coiled. Moreover, the present invention provides that the filaments be provided with longitudinally spaced formations adapted to form the coupling heads, when the filaments are jointly coiled on the mandrel.

According to another feature of this invention, the apparatus for coiling the coupling elements comprises a support frame or housing with a drive device, the usual spools for coiling the coupling elements, the spools being rotatable about their respective axes, and a coiling mechanism between the spools and the mandrel for guiding the filaments on the latter and relatively interchanging the positions of the filaments at least once on each rotation of the coiling mechanism. The mandrel of this system may then be stationary and can be surrounded by a driven shaft in which a planetary guide for the filaments is eccentrically carried. The guide sleeve or bushing can be formed with corresponding bores through which the filaments are fed and spaced apart along an axial plane through the guide sleeve on opposite sides of the eccentric rotation axis thereof. The guide sleeve may be freely rotatable relatively to the shaft so that the planetary sleeve is rotatable with respect to its drive mechanism which, in turn, is rotatable about the axis of the mandrel, thereby slinging the two or more filaments about the mandrel while imparting a twist to them to cause the positional interchange mentioned earlier. The movement of the sleeve with respect to the axis of the mandrel can be analogized to the movement of the planets around the sun, i.e. the sleeve rotates about its own axis as it sweeps through its orbit of revolution around the mandrel.

According to a further feature of this invention, the apparatus comprises at least two mandrels positioned in mutually parallel, transversely spaced relationship, i.e. with their axis parallel to one another and cantilevered at one end in a common support of the machine, while the respective planetary mandrels are connected via a coupling member or link which is free to rotate. The coupling means may be a universal joint or Cardan coupling.

In order to enable the threads to be twisted relative to one another as they are wound about the mandrel, it is desirable to feed the threads continuously from an upstream position of the coiling head and pass the threads through the planetary thread guide. The thread emerges at the other side of the twisting and coiling head and is there wound upon the mandrel from which the coil can be advanced to a fixing station at which it is brought to the plastic deformation temperature of the synthetic resin and permitted to relieve any stress therein. If the coupling heads have not previously been formed upon the threads, the coil advancing from the mandrel may be so deformed, although it is preferred to form the coupling heads on the threads prior to winding of the latter on the mandrel.

According to a more specific feature of this invention, the mandrel, which cannot be supported by ribs from a housing structure because of the planetary movement of the thread guide and the corresponding movement of the threads fed continuously to the latter, is held stationary in the housing by a planetary gear arrangement in which the planetary support is driven and has a gear engaging a sun wheel which supports the mandrel and remains stationary by virtue of the planetary gearing. When two planetary gear assemblies are provided side by side in the head, a single chain can pass about the drive sprockets of these planetary gear assemblies and operate two coiling mechanisms. In this case, a link interconnects the freely rotatable guides to hold them in a predetermined orientation with respect to the support structure but allows them to rotate them relatively to the planetary member carrying them. The link thus avoids the need for housing-mounted means controlling the orientation of the thread guide.

It has been found to be important to position the mandrel and the planetary thread guide such that the distance between the centers of the thread-guide bores is related to the pitch of the coil and, more particularly, equal to the length of the thread necessary to complete a single turn of the coil. In this case, the monofilament threads cross once at one side of the mandrel and once at the other side in an overcross/undercross relationship per turn. It has also been found to be desirable to provide the head upon the threads prior to coiling as has already been noted this arrangement resulting in an interlocking of two coupling elements when the coils formed thereby are drawn apart in a direction transverse to the coil axis. Moreover, the mandrel can be round or flat (see the prior applications and patents mentioned hereinafter) and preferably is generally rectangular. When a flat mandrel is used, the crossover points are preferably located along a broad side thereof.

When the cross-section of the individual threads of thermoplastic monofilament is generally ellipse- or crescent-shaped or even somewhat rectangular, special devices for forming the coupling heads on the coupling elements can be avoided. This is the case because the twisting and coiling operation effectively kinks or bends the monofilament to yield a formation resembling a coupling head or in any event capable of interlocking with the corresponding coupling heads of the other coupling element in a slide-fastener stringer. When the filament is of circular cross-section, I may provide means for forming the coupling heads thereon ahead of the coiling mechanism. However, it is also possible to provide the shaping or pressing elements or stations downstream of the coiling head.

A further feature of this invention resides in providing the thread-guide bushings or sleeves with guide bores parallel to the sleeve axis. In the guide bushing, there is disposed an anvil against which the thread is pressed as the guide sleeve swings past the respective embossing stations. In this case, the coupling heads are formed on the monofilament threads within the guide bushings. The outlet sides of guide bores of the bushing preferably open in the direction of advance of the coils but somewhat behind the upstream end of the mandrel on which the threads are wound between the outlet side of the guide bushing and the beginning of the mandrel. It is advantageous to provide a frustoconical guide surface which facilitates the coil of the threads and also serves to feed the coil forwardly. This frustoconical surface, of course, converges in the direction of the mandrel.

Moreover, the embossing wheels may be located in the housing of the coiling head at locations at which adjustment is facilitated and preferably where windows are provided for allowing investigation of the step in which the heads are formed.

It will be understood that this system allows the spools from which the monofilament is supplied to the coiling head to remain stationary and coiling to be carried out with a stationary mandrel. The danger of breakdown is diminished, the quality of the coil is improved and the cost of apparatus and equipment is diminished.

The above and other objects, features and advantages of this invention will become more readily apparent from the following description, reference being made to the accompanying drawing in which:

FIG. 7 is a diagram of the pattern of movement of the guide sleeve with respect to the mandrel, taken in the direction of arrow IV;

FIG. 8 is an enlarged cross-sectional view taken generally along the line VIII—VIII of FIG. 7;

Figure 2:
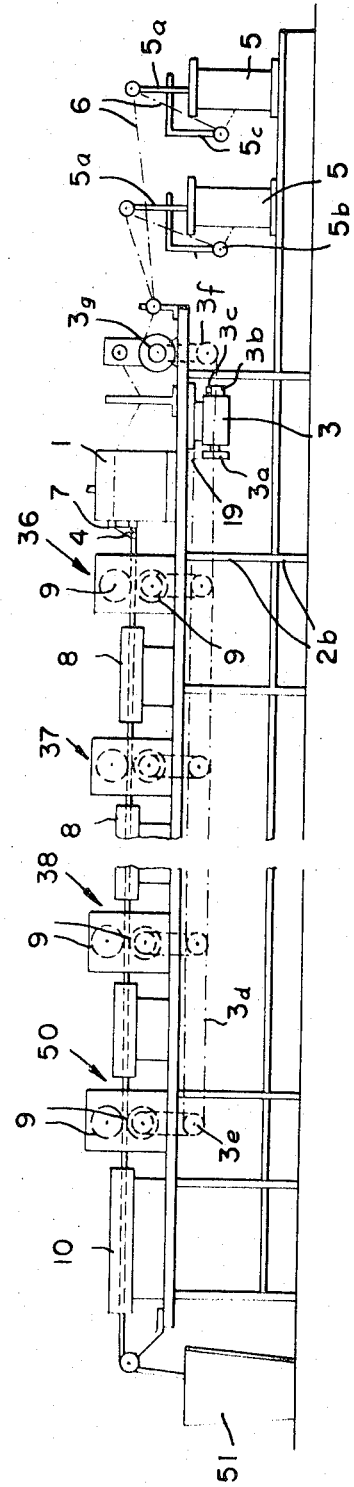
FIG. 2 is a side-elevational view of this apparatus.
Figure 1:
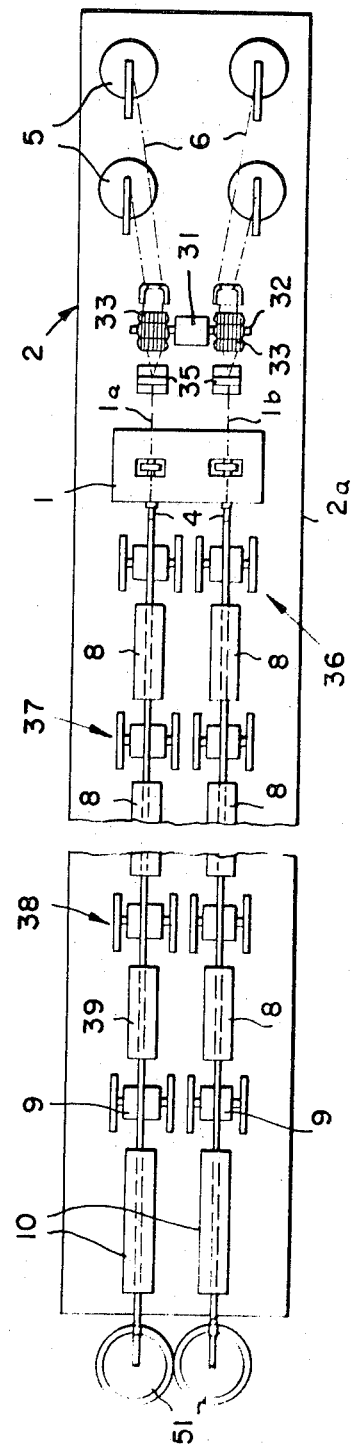
FIG. 1 is a plan view, partly in diagrammatic form, of an apparatus for producing two pairs of coupling elements in accordance with the present invention.

In FIGS. 1 and 2 I show the overall outlines of an apparatus for producing continuous coupling-element chains in accordance with the present invention. It will be understood that the coupling elements produced by this system may be any of those shown in my commonly assigned copending application mentioned earlier or commonly assigned applications Ser. No. 591,753 (now U.S. Pat. No. 3,482,292), Ser. No. 619,768 (now U.S. Pat. No. 3,487,511), Ser. No. 619,833 (now U.S. Pat. No. 3,487,510), Ser. No. 620,972 (now U.S. Pat. No. 3,430,098) and Ser. No. 624,647 (now U.S. Pat. No. 3,490,108) or in my prior patents Nos. 3,353,233, 3,353,256 and 3,340,594 all of which have been referred to in the parent application.

Moreover, the interconnecting coupling elements may be stitched in their interfitted form simultaneously onto respective support tapes to form the stringer.

The apparatus of the present invention comprises a coiling head 1 which is adapted to accommodate two coiling lines represented generally at 1a and 1b. The coiling head 1 is mounted upon a support 2 comprising a table 2a extending horizontally above a base 2b and carried by legs 2c (FIG. 2). Beneath the table, I provide a drive motor 3 whose sprocket 3a is designed to rotate a chain 19 (see FIG. 6) which, in turn, drives the coiling head 1. The motor 3 may also drive a reduction gear 3b having a sprocket 3c engaging a chain 3d. The latter passes over a multiplicity of driven sprockets 3e and 3f which are rotated in the clockwise sense by the chain and are connected to said rollers and forming rollers generally shown at 3g or 9 in FIG. 2. Each of the coiling lines comprises a respective fixed coil mandrel 4, two such mandrels being used in the systems of FIGS. 1–6. The mandrel 4 extends from the head 1 forwardly (to the left in FIGS. 1 and 2) and are transversely spaced while being parallel to one another and generally horizontal.

Each of the filament-supply stations for the coiling line comprises a pair of upright posts 5a about which respective spools 5 of thermoplastic monofilaments can be delivered through guide eyes 5b mounted upon downwardly extending arms 5c of the posts 5a. The spools 5 are free to rotate about their axis and the posts 5a. The supply means further comprises a support 31 carrying a horizontal shaft 32 which is driven by the sprocket 3g within the housing 31 and carries a pair of filament-fed drums 33 which draw the thermoplastic threads 6 from the spools 5 over a guide roller 34 and feeds the pair of threads of each line through respective guides 35 to the head 1.

Figure 9:
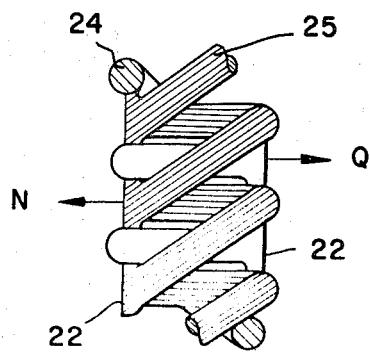
FIG. 9 is a diagrammatic elevational view of the interfitting coils after the removal thereof from the mandrel.

Downstream of the mandrel 4, there is provided a transport station 36 at which the rollers 9, driven by chain 3d, remove the coil and intertwined coupling elements having the configuration shown in FIG. 9 from the mandrels at the same rate at which the coil is formed, the synchronization being assured by the interconnection of chains 19 and 3d. The transport mechanism 36 feeds the coil to a heating assembly represented at 8 in which the thermoplastic coils are heated and set as described in the aforementioned applications and Letters Patent and the art cited therein. The heated and set coils may then be advanced via a first forming station 37, and intervening heating station 8, a second heating assembly 39 and the rollers 9 of a transport assembly 50 through the cooling chambers 10 and into respective cans 51 in which the coils are accumulated. The forming stations may be rollers, dies or the like which impart the final configuration to the coupling elements whereas the heating units serve to render the coils sufficiently plastically deformable to enable their shaping by the forming stations. In addition, the heating elements set the coils in their tightly wound configuration.

In FIGS. 3–7, there is shown the coiling head of the apparatus of the present invention. The coupling head which comprises the mandrels 5 which are transversely spaced apart in the common horizontal plane P with a spacing S. The mandrels 4 project in the forward direction (to the left in FIGS. 1 and 2) from a housing structure 40, the base 41 of which is bolted to the table 2a. Each of the mandrels is mounted on a sun gear 20 (FIG. 6) and is rotatable relative to a respective planetary wheel 11 through which the mandrels project. The planetary wheels or disks 11 can be considered to constitute shafts in which thread-guide bushings 12 are journaled.

Figure 4:
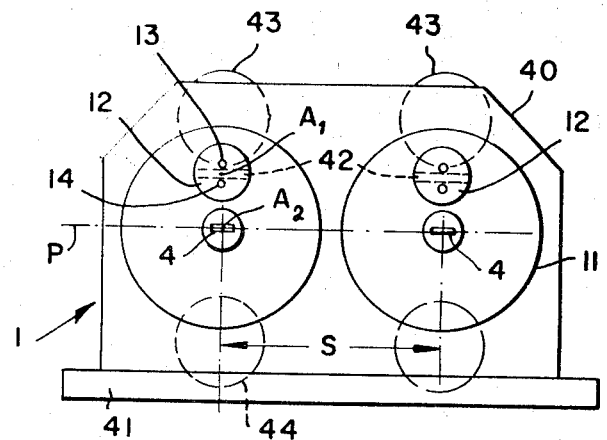
FIG. 4 is an elevational view taken in the direction of arrow IV of FIG. 3.
Figure 11:
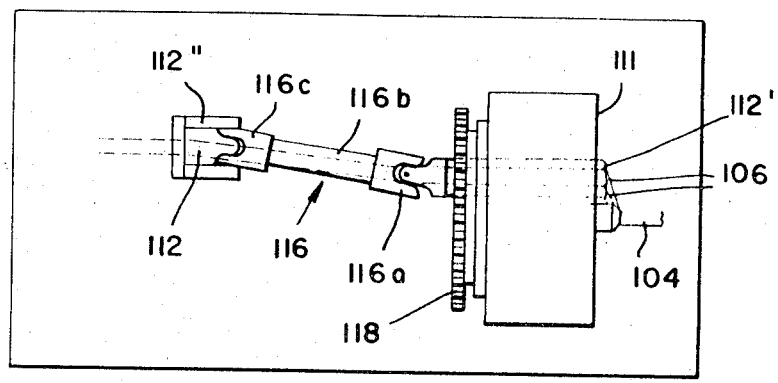
FIG. 11 is an elevational view showing a universal-joint arrangement for guiding the filaments in their planetary or orbital movement.

The thread-guide bushings are each provided with a pair of parallel guide bores 13 and 14 which are spaced apart on opposite sides of the axis $A_1$ of the bushing which is offset or eccentric from the axis $A_2$ of the respective mandrel 4 by the radial distance R (FIGS. 5 and 7), the spacing B between the centers $C_1$, $C_2$ of the bores 13 and 14 being equal to the length of the thread necessary for one turn of the coil to be formed by the mandrel. The mandrels 4 are of rectangular section as can be seen in FIGS. 4 and 7. The thread-guide bushings 12 are coupled for joint angular movement by a link 15 which maintains the vertical orientation of the bores 13 and 14 of these bushings as they rotate about the mandrel 4 as represented by the arrow D. Thus no mechanism attached to the housing is required for orienting the guide bushings. The path described by the center of the respective guide bushings is shown at E whereas the orientation of the diametrical plane of the bores 13 and 14 of the guide bushing 12 in four distinct positions is represented at $P_1$, $P_2$, $P_3$ and $P_4$ in FIG. 7. The center $C_1$ of bore 13 describes the circular path F of FIG. 7 whereas the bore 14 described the broken-line path G from which it may be seen that the threads emerging from these guides cross alternately over and under one another in each traverse along the right-hand side 4' and the left-hand side 4" of the mandrel in each turn of the thermoplastic monofilament. It will be understood that, as shown in FIG. 11, the sleeve 112 can be eccentrically rotated via a universal joint arrangement represented at 116 and having a universal or cardan joint 116a driven by the bushing 112' which is rotatably mounted on the disk 111. The latter is driven by the sprocket wheel 118 and surrounds the mandrel 104. An arm 116b is connected with the cardan joint 116a and is hollow to permit the thread 106 to pass therethrough. The arm 116b is coupled with the cardan joint 116c which, in turn, is received in the support 112" for the bushing 112. As the disk 111 rotates, the cardan linkage 116a through 116c maintains the original orientation of the bores in the bushing 112' as the latter swings about the mandrel 104 in a manner analogous to that shown in FIG. 7 for the bushing 12.

A planetary gear assembly represented by the planetary wheels 17 mesh with gears 20 carrying mandrels 4 to prevent rotation of the mandrels within the housing 40. The drive disk 11 is provided with a sprocket wheel 18 (FIGS.

3, 5 and 6) which is driven by a chain 19 from the motor 3 via a drive sprocket 3a (FIG. 2). The chain 19 (FIG. 6) passes over both sprocket wheels 18 for synchronous rotation of the guide bushings 12.

Figure 5:
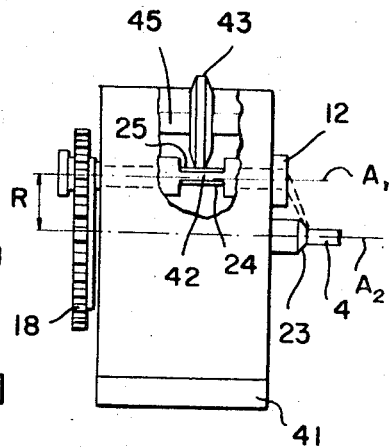
FIG. 5 is a side-elevational view, partly broken away, of the coiling head of FIG. 3 taken in the direction of arrow V thereof.
Figure 3:
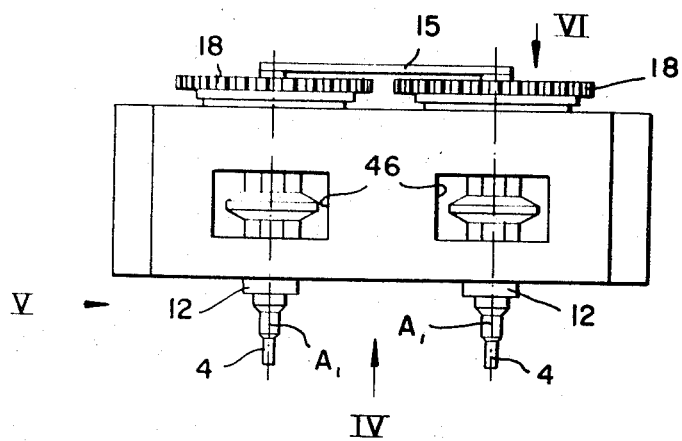
FIG. 3 is a plan view, drawn to an enlarged scale, of the mandrel and coiling device of FIGS. 1 and 2.
Figure 6:
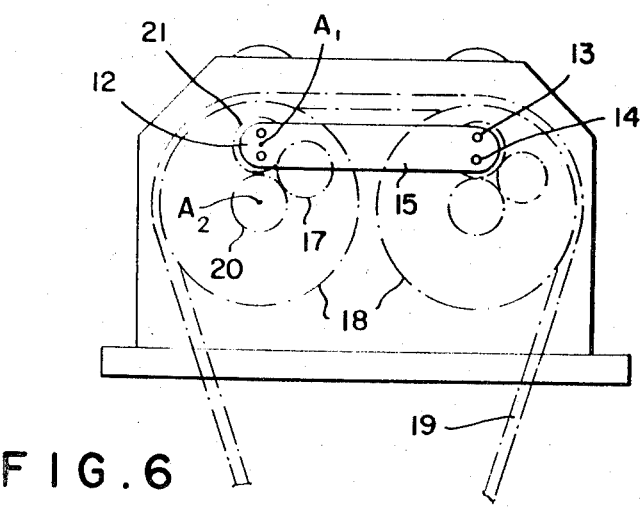
FIG. 6 is a rear-elevational view of the coiling head taken in the direction of arrow VI of FIG. 3, showing the drive chain in dot-dash lines.

The apparatus shown in FIGS. 1–8 is primarily designed to use circular-cross-section thermoplastic monofilament and thus provide the threads with coupling heads as shown at 22 in FIG. 8 within the bushings 12. To this end, the guide bores 13 and 14 are interrupted to define the anvil 42 against which a forming roller 43 or 44 can compress the threads 25 or 24, respectively, to produce the coupling heads 22 (see FIGS. 4, 5 and 8). The forming rollers 43 and 44 are disposed in the housing 40 so as to be rotatable about the respective shafts 45 and allow inspection of the shaping rollers through windows 46 (FIGS. 3 and 5).

As can be seen from FIG. 8, the bores 13 and 14 of the guide bushing 12 open in the direction of arrow H and are rounded or flared outwardly at 13' and 14' in this direction. The mouths 13' and 14' of the bores 13 and 14 terminate in a vertical plane J which is spaced rearwardly from the vertical plane K at which the rectangular-cross-section mandrel 4 commences. In the region between these planes J and K, the mandrel support 47 is formed with a frustoconical portion 23 which guides the threads 24 and 25 onto the mandrel by twisting them so that cross-overs $M_1$ and $M_2$ are formed at opposite diametrical sides of the mandrel 4 at each turn. It will be understood, of course, that the eccentricity of the centers $A_1$ of the bushings 12 may be adjusable and that the eccentricities of the bores 13 and 14 may be modified to produce coupling elements of varying pitch. The length of the thread between two heads 22 is, of course, equal to the length L of a single turn of each coil. Between the spools 5 and the coiling head 1, tension-controlling devices can be provided as represented at 23 to maintain the proper tension on the threads 6.

Figure 10:
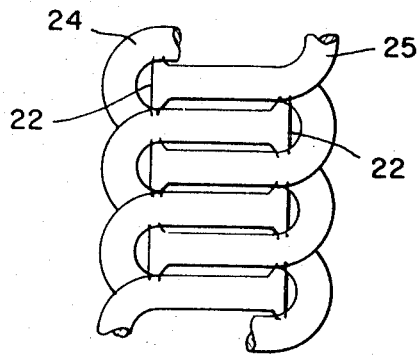
FIG. 10 is a view of the coils after they have been drawn apart slightly and brought into interconnecting relationship for joint mounting upon respective support tapes.

In FIG. 9, there is shown the intertwined coils after their passage from the mandrel and with invisible portions not indicated. One of the coils is lined to distinguish it from the second coil. In the embodiment shown, the heads 22 are already formed on the coil. In the event, coiling occurs without preformation of the heads, the forming roller 9 will, of course, be provided. After forming and head-setting, a transverse force is applied to the coils 24, 25 as represented by the arrows N and Q to draw the coils into the position shown in FIG. 10. After such separation, a further heat-setting in the heating units 8 can be carried out and the interconnected coupling elements stitched or otherwise affixed to the respective support tapes.

The improvement described and illustrated is believed to admit of many modifications within the ability of persons skilled in the art, all such modifications being considered within the spirit and scope of the invention except as limited by the appended claims.

I claim:

1. An apparatus for making continuous coupling elements adapted to be attached to respective support tapes to form a slide-fastener stringer, said apparatus comprising a stationary mandrel having an axis; coiling means rotatable about said mandrel and formed with a rotatable planetary thread guide provided with passages to accommodate a pair of the thermoplastic monofilamentary threads and offset from the axis of rotation of said thread guide; thread-supply means for feeding said pair of threads to said guide; and drive means for swinging said thread guide around the axis of said mandrel and for simultaneously rotating said guide about the axis of the guide for joint coiling of said threads about said mandrel with twisting of the threads as they are coiled on said mandrel to cross over and under one another in each turn of the coils formed by said threads on said mandrel.

2. An apparatus for making continuous coupling elements adapted to be attached to respective support tapes to form a slide fastener stringer, said apparatus comprising a stationary mandrel having an axis; coiling means rotatable about said mandrel and formed with a planetary thread guide adapted to accommodate a pair of thermoplastic monofilamentary threads; and thread-supply means for feeding said pair of threads to said guide for joint coiling of said threads about said mandrel with twisting of the threads as they are coiled on said mandrel to cross over and under one another in each turn of the coils formed by said threads on said mandrel, said coiling means comprising a housing, planetary gear means nonrotatably positioning said mandrel in said housing, a drive member rotatable about said axis, a bushing rotatably mounted in said drive member eccentrically with respect to said axis and forming said thread guide, said bushing being provided with a pair of spaced-apart bores respectively receiving said threads, and means for maintaining a predetermined orientation of said bores with respect to said mandrel as said bushing is rotated about said axis.

3. The apparatus defined in claim 2 wherein a further similar mandrel and coiling means is provided in said housing and said means for maintaining the predetermined orientation of the first-mentioned bushing is a link connected to the first-mentioned bushing with the bushing of said first coiling means.

4. The apparatus defined in claim 2 wherein the last-mentioned means includes a universal-joint mechanism connected to said bushing.

5. The apparatus defined in claim 2 wherein said bushing defines an anvil, further comprising at least one forming member in said housing engageable with at least one of said threads in the path of rotation of said bushing for compressing the respective thread against said anvil and periodically form coupling heads thereon.

6. The apparatus defined in claim 5 wherein said mandrel is disposed forwardly of the bushing, said apparatus further comprising a frustoconical guide between the bushing and said anvil and converging in the direction of the latter for guiding said threads onto said anvil.

7. The apparatus defined in claim 5, further comprising forming means downstream of said anvil for deforming said coils into a pair of interconnected coupling elements adapted to be mounted directly upon respective tapes.

References Cited

UNITED STATES PATENTS

| | | | |
|---|---|---|---|
| 2,541,728 | 2/1951 | Wahl | 18—1ZX |
| 2,541,729 | 2/1951 | Wahl | 18—1ZX |
| 2,907,066 | 10/1959 | Wahl | 18—1ZX |
| 3,053,288 | 9/1962 | Burbanks | 18—1ZX |
| 3,168,606 | 2/1965 | Burbanks | 18—1ZUX |

J. SPENCER OVERHOLSER, Primary Examiner

U.S. Cl. X.R.

18—13